US012308978B2

(12) United States Patent
Turtinen et al.

(10) Patent No.: US 12,308,978 B2
(45) Date of Patent: May 20, 2025

(54) FAILURE RECOVERY FOR SERVING CELL

(71) Applicant: Nokia Technologies Oy, Espoo (FI)

(72) Inventors: Samuli Turtinen, Ii (FI); Timo Koskela, Oulu (FI); Chunli Wu, Beijing (CN)

(73) Assignee: Nokia Technologies Oy, Espoo (FI)

(*) Notice: Subject to any disclaimer, the term of this patent is extended or adjusted under 35 U.S.C. 154(b) by 396 days.

(21) Appl. No.: 17/778,082

(22) PCT Filed: Nov. 21, 2019

(86) PCT No.: PCT/CN2019/119986
§ 371 (c)(1),
(2) Date: May 19, 2022

(87) PCT Pub. No.: WO2021/097761
PCT Pub. Date: May 27, 2021

(65) Prior Publication Data
US 2023/0007554 A1  Jan. 5, 2023

(51) Int. Cl.
*H04W 4/00* (2018.01)
*H04L 1/1829* (2023.01)
*H04W 76/38* (2018.01)

(52) U.S. Cl.
CPC .......... *H04L 1/1864* (2013.01); *H04W 76/38* (2018.02)

(58) Field of Classification Search
CPC .............................. H04W 36/08; H04W 76/38
See application file for complete search history.

(56) References Cited

U.S. PATENT DOCUMENTS

| | | | | |
|---|---|---|---|---|
| 10,602,549 B2 * | 3/2020 | Tsai | ...................... | H04B 7/0626 |
| 11,140,567 B2 * | 10/2021 | Tsai | ...................... | H04W 24/10 |
| 2019/0245737 A1 | 8/2019 | Zhou et al. | | |
| 2019/0306765 A1 | 10/2019 | Cirik et al. | ........................ | 36/79 |
| 2020/0137821 A1 * | 4/2020 | Cirik | ..................... | H04B 7/063 |
| 2020/0351860 A1 * | 11/2020 | Chen | ................. | H04W 74/0833 |
| 2020/0374960 A1 * | 11/2020 | Deenoo | ................ | H04B 7/0695 |
| 2021/0091844 A1 * | 3/2021 | Koskela | ............... | H04B 7/0617 |
| 2021/0105172 A1 * | 4/2021 | Luo | ................... | H04W 74/0833 |
| 2021/0344405 A1 * | 11/2021 | Yuan | ................ | H04W 74/0833 |

(Continued)

FOREIGN PATENT DOCUMENTS

| | | |
|---|---|---|
| CN | 110249683 A | 9/2019 |
| CN | 110291807 A | 9/2019 |

(Continued)

OTHER PUBLICATIONS

Hailu et al., Performance Analysis of MAC-based Beam Tracking and Failure Detection and Recovery, 2021, IEEE, pp. 1-5. (Year: 2021).*
"Feature lead summary #2 on L1-SINR and SCell BFR", Apple Inc., 3GPP TSG RAN WG1 #98, R1-1909743, Aug. 2019,24 pages.
"The Remaining Issues on BFR on SCell", ZTE, Sanechips, 3GPP TSG-RAN2 Meeting #108, R2-1916069, Nov. 2019, 4 pages.

(Continued)

*Primary Examiner* — Elisabeth Benoit Magloire
(74) *Attorney, Agent, or Firm* — McCarter & English LLP (57) ABSTRACT

Embodiments of the present disclosure relate to failure recovery for serving cell. A terminal device detects a failure on a serving cell of the terminal device. If the beam failure is detected, the terminal device transmits information concerning the detected failure to a network device. The network device is associated with the serving cell. The terminal device disables further transmission of the information to the network device.

17 Claims, 6 Drawing Sheets

(56) References Cited

U.S. PATENT DOCUMENTS

| | | | |
|---|---|---|---|
| 2021/0385896 A1* | 12/2021 | Kim | H04W 24/04 |
| 2022/0210683 A1* | 6/2022 | Li | H04B 7/0695 |
| 2022/0294512 A1* | 9/2022 | Matsumura | H04W 72/1263 |
| 2022/0329312 A1* | 10/2022 | Matsumura | H04W 76/19 |
| 2024/0172310 A1* | 5/2024 | Xu | H04B 7/0695 |

FOREIGN PATENT DOCUMENTS

| | | | | |
|---|---|---|---|---|
| CN | 110351745 A * | 10/2019 | | H04W 24/02 |
| CN | 116709587 A * | 9/2023 | | |
| WO | WO 2019/029709 A1 | 2/2019 | | |
| WO | WO-2019/137472 A1 | 7/2019 | | |
| WO | WO-2019/154418 A1 | 8/2019 | | |
| WO | WO-2019146498 A1 * | 8/2019 | | H04B 7/0602 |
| WO | WO 2019/192019 A1 | 10/2019 | | |
| WO | WO-2019/192713 A1 | 10/2019 | | |
| WO | WO-2020042160 A1 * | 3/2020 | | H04B 7/06964 |

OTHER PUBLICATIONS

"Procedures and MAC CE design for BFR for SCells", Qualcomm Incorporated, 3GPP TSG-RAN WG2 Meeting #108, R2-1916067, Nov. 2019, 5 pages.

"Remaining details of SCell BFR", Nokia, Nokia Shanghai Bell, 3GPP TSG-RAN WG2 Meeting #108, R2-1915332. Nov. 2019, 4 pages.

Nokia, Nokia Shanghai Bell, ZTE Corporation, Sanechips, 3GPP TSG-RAN WG2Meeting #107 R2-1910622, Aug. 16, 2019.

LG Electronics Inc, "Discussion on beam failure recovery for SCell" 3GPP TSG-RAN WG2 Meeting #107bis R2-1913137, Oct. 4, 2019.

ZTE Corporation, Sanechips,"Considerations on Beam failure Recovery for SCell " 3GPP TSG RAN WG2 Meeting #107bis R2-19xxxxx, Oct. 4, 2019.

* cited by examiner

FAILURE RECOVERY FOR SERVING CELL

CROSS REFERENCE TO RELATED APPLICATION

This patent application is a U.S. National Stage application of International Patent Application Number PCT/CN2019/119986 filed Nov. 21, 2019, which is hereby incorporated by reference in its entirety.

FIELD

Embodiments of the present disclosure generally relate to the field of telecommunication and in particular, to methods, devices, apparatuses and computer readable storage media for failure recovery for serving cell.

BACKGROUND

New radio access system, which is also called NR system or NR network, is the next generation communication system. It has been agreed that carrier aggregation (CA) which is used in Long Term Evolution (LTE)-Advanced to increase the bandwidth will be supported in the NR system. When CA is used, there are a number of serving cells. Generally, a primary cell (PCell) and at least one secondary cell (SCell) are provided. A beam failure may occur when the quality of beam pair(s) of a serving cell falls low enough (for example, comparison with a threshold or time-out of an associated timer).

A beam failure recovery (BFR) procedure is a mechanism for recovering beams when all or part of beams serving user equipment (UE) has failed. BFR may be also referred to as link reconfiguration or link recovery. Aim of BFR is to detect when one or more physical downlink control channels (PDCCH) links are considered to be in failure conditions and recover the link. To recover the link, UE initiates signaling towards network to indicate beam failure and a new potential link (beam) called candidate link (beam). As a response to beam failure recovery request (BFRR) received from the UE, the network may configure UE with a new PDCCH link. BFR of a SCell (which is also referred to as SCell BFR herein) event is reported to the network by means of dedicated uplink signal and SCell BFR media access control (MAC) control element (CE) or just SCell BFR MAC CE.

SUMMARY

In general, example embodiments of the present disclosure provide a solution for failure recovery for serving cell.

In a first aspect, there is provided a terminal device. The terminal device comprises at least one processor; and at least one memory including computer program codes; the at least one memory and the computer program codes are configured to, with the at least one processor, cause the terminal device to detect a failure on a serving cell of the terminal device; in response to the failure being detected, transmit information concerning the detected failure to a network device, the network device associated with the serving cell; and disable further transmission of the information to the network device.

In a second aspect, there is provided a network device. The network device comprises at least one processor; and at least one memory including computer program codes; the at least one memory and the computer program codes are configured to, with the at least one processor, cause the network device to determine configuration information concerning a timer for a terminal device, the configuration information at least indicating a valid period of the timer; and transmit the configuration information to the terminal device, such that the terminal device disables based on the timer further transmission of information having been transmitted to the network device, the information concerning a failure detected on a serving cell associated with the network device.

In a third aspect, there is provided a method. The method comprises detecting, at a terminal device, a failure on a serving cell of the terminal device; in response to the failure being detected, transmitting information concerning the detected failure to a network device, the network device associated with the serving cell; and disabling further transmission of the information to the network device.

In a fourth aspect, there is provided a method. The method comprises determining, at a network device, configuration information concerning a timer for a terminal device, the configuration information at least indicating a valid period of the timer; and transmitting the configuration information to the terminal device, such that the terminal device disables based on the timer further transmission of information having been transmitted to the network device, the information concerning a failure detected on a serving cell associated with the network device.

In a fifth aspect, there is provided an apparatus comprising means for detecting, at a terminal device, a failure on a serving cell of the terminal device; means for in response to the failure being detected, transmitting information concerning the detected failure to a network device, the network device associated with the serving cell; and means for disabling further transmission of the information to the network device.

In a sixth aspect, there is provided an apparatus comprising means for determining, at a network device, configuration information concerning a timer for a terminal device, the configuration information at least indicating a valid period of the timer; and means for transmitting the configuration information to the terminal device, such that the terminal device disables based on the timer further transmission of information having been transmitted to the network device, the information concerning a failure detected on a serving cell associated with the network device.

In a seventh aspect, there is provided a non-transitory computer readable medium comprising program instructions for causing an apparatus to perform at least the method according to the above third aspect.

In an eighth aspect, there is provided a non-transitory computer readable medium comprising program instructions for causing an apparatus to perform at least the method according to the above fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, an Integrated Access Backhaul (IAB), and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Figure 1:
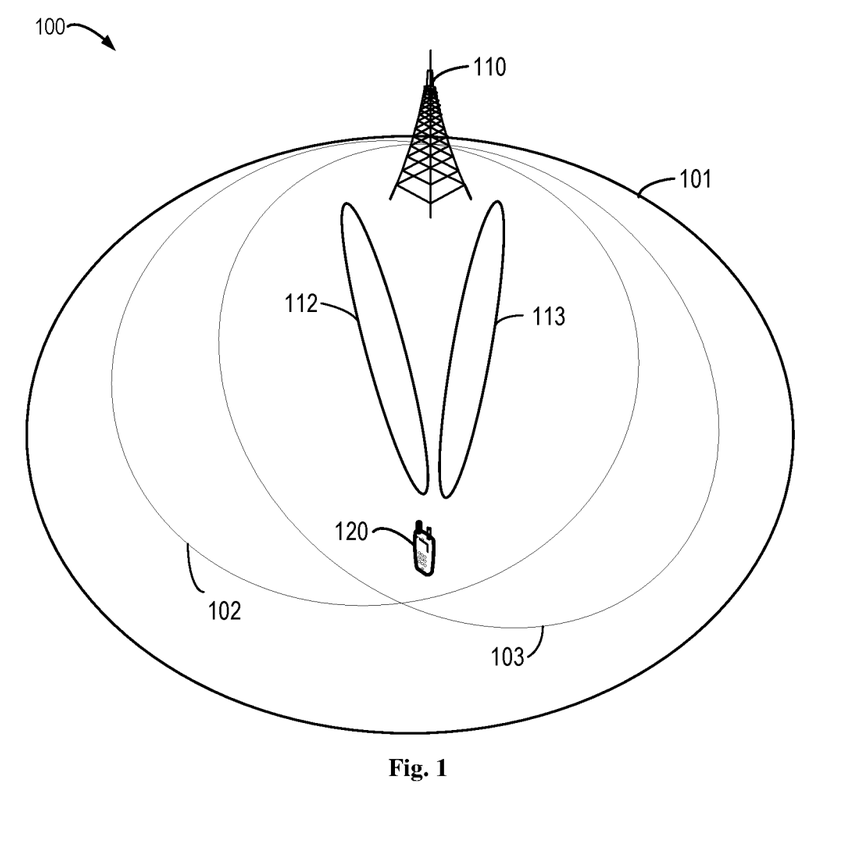
FIG. 1 illustrates an example communication network in which embodiments of the present disclosure may be implemented.

FIG. 1 shows an example communication network 100 in which embodiments of the present disclosure can be implemented. The network 100 includes a network device 110 and a terminal device 120 served by the network device 110. The network 100 may provide one or more serving cells 101, 102, 103 to serve the terminal device 120. It is to be understood that the number of network devices, terminal devices and serving cells is only for the purpose of illustration without suggesting any limitations. The network 100 may include any suitable number of network devices, terminal devices and serving cells adapted for implementing embodiments of the present disclosure. It is to be noted that the term "cell" and "serving cell" can be used interchangeably herein.

In the communication network 100, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

CA can be supported in the network 100, in which two or more component carriers (CCs) are aggregated in order to support a broader bandwidth. In CA scenario, the network device 110 may provide to the terminal device 120 a plurality of serving cells, for example one PCell 101 and two SCells 102, 103 as shown in FIG. 1. Although two SCells 102, 103 are shown in FIG. 1, the network device 110 may provide less or more SCells. It is also to be understood that the configuration of PCell 101 and SCells 102, 103 shown in FIG. 1 is only for the purpose of illustration without suggesting any limitations. PCell 101 and SCells 102, 103 may be in other configuration than that shown in FIG. 1.

In some example embodiments, for example in the scenario of dual connection, the network 100 may comprise another network device (not shown), which may employ the same or a different radio access technology with the network device 110. The other network device may also provide the terminal device 120 with serving cells, such as a primary secondary cell (PSCell) and other SCells. PCell and/or PSCell may also be referred to as Special Cell (SpCell) herein. Wherever referred herein as PCell may equally be applicable to PSCell.

In some example embodiments, the network device 110 is configured to implement beamforming technique and transmit signals to the terminal device 120 via a plurality of beams. The terminal device 120 is configured to receive the signals transmitted by the network device 110 via the plurality of beams. There may be different beams configured for the PCell 101 and the SCells 102, 103. As shown in FIG. 1, DL beams 112 and 113 are configured for the SCells 102 and 103, respectively. It is to be understood that the SCells 102 and 103 may have more beams associated therewith. Although not shown, the PCell 101 may also have beams associated therewith.

In some example embodiments, communications between the network device 110 and the terminal device 120 may be based on unlicensed band, and more particularly, based on unlicensed wide frequency bands. Although not shown, there may be other communication technologies in the communication network, for example, Wireless-Fidelity (Wi-Fi/802.11), which share the same unlicensed band. Wideband operations may be supported by means of for example bandwidth part (BWP) in the communication network 100 or carrier aggregation or wireless channel bonding. In the case where communications are based on unlicensed band, the terminal device 120 may perform Listen-before-talk (LBT) before channel access.

A beam failure may occur on any of the PCell and the SCells. To better understand the principle and example embodiments of the present disclosure, a brief introduction to the beam failure detection (BFD) and BFR is now described below.

As mentioned above, SCell BFR event is reported to the network device by means of SCell BFR MAC CE. The SCell BFD is performed per cell and the BFD mechanism for SpCell is adopted for SCell BFD. Furthermore, there can be multiple beam failure detection triggers triggering the transmission of the SCell BFR MAC CE while the SCell BFR MAC CE is already pending for transmission.

As a result, in beam failure detection and recovery procedure, for each serving cell configured for beam failure detection, if beam failure instance indication has been received from lower layers (for example, physical layer), the MAC entity shall start or restart the timer for the beam failure detection, such as the beamFailureDetectionTimer, and further increments BFI_COUNTER, which is the counter for beam failure instance indication and is initially set to 0, by 1. When the BFI_COUNTER is equal to or exceeds a threshold, for example beamFailureInstanceMaxCount, the MAC layer shall trigger BFR if the serving cell is SCell.

If the BFR procedure determines that at least one BFR has been triggered and not cancelled, the MAC entity shall determine whether uplink shared (UL-SCH) resources are available for a new transmission and whether the UL-SCH resources can accommodate the SCell BFR MAC CE plus its subheader as a result of logical channel prioritization. If it is determined that UL-SCH resources are available and the UL-SCH resources can accommodate the SCell BFR MAC CE plus its subheader as a result of logical channel prioritization, the MAC entity shall instruct the Multiplexing and Assembly procedure to generate the SCell BFR MAC CE. Otherwise, the MAC entity shall trigger a Scheduling Request (SR) for SCell BFR.

The BFR triggering (which occurs for the SCell specifically) as well as the result of the MAC action (MAC entity specifically) is described above. In general, the MAC entity will check if it has UL resources to send SCell BFR MAC CE and if it has the UL resources, it will generate SCell BFR MAC CE and send the SCell BFR MAC CE by using the given UL resources. If it does not have the UL resources, it will trigger the SR procedure to request UL resources and to send the SCell BFR MAC CE by using the UL resources allocated for BFR.

A network device may configure a terminal device with a set of reference signals (RSs) for monitoring the quality of the link. For example, the terminal device (such as a UE) may be provided, for a serving cell, a set $\bar{q}_0$ of periodic CSI-RS resource configuration indexes. In non-discontinuous reception (DRX) mode operation, the physical layer in the terminal device provides an indication to higher layers (for example, the MAC layer) when the radio link quality for all corresponding resource configurations in the set $\bar{q}_0$ that the terminal device uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity among the periodic CSI-RS configurations and/or SS/PBCH blocks in the set $\bar{q}_0$ that the terminal device uses to assess the radio link quality and 2 msec. In DRX mode operation, the physical layer provides an indication to higher layers when the radio link quality is worse than the threshold $Q_{out,LR}$ with a periodicity determined as described in TS 38.133.

The indication provided by the physical layer to the higher layers refers to the beam failure instance indication described above with respect to the MAC entity. As can be seen, the physical layer indicates the beam failure instance indication periodically to the MAC layer when the radio link quality is worse than the threshold $Q_{out,LR}$, i.e. when all the failure detection resources in set of $\bar{q}_0$ are determined to be in failure condition. When link quality is not worse than threshold, no indication is provided to the MAC layer.

In view of the above, whenever the beams are in failure condition on a given cell, the physical layer will indicate the beam failure instance indication to the MAC layer periodically as described above. Given this principle about the MAC behavior for SCell BFR, every indication will trigger a new SCell BFR MAC CE (and trigger the dedicated SR transmission/CBRA in case no uplink resources are available) even though the terminal device would have already sent the SCell BFR MAC CE to the network device concerning the same beam failure event.

The beam failure detection procedure is only reset when the Hybrid Automatic Repeat reQuest (HARQ) acknowledgement (ACK) is received on the HARQ process that that was used to transmit the SCell BFR MAC CE or an UL grant for new transmission is received for the HARQ process which is considered as an ACK for the previous transport block (TB) since there is no Physical HARQ Indicator Channel (PHICH) in NR system. Even in the case of successful beam failure recovery based on successful delivery of SCell BFR MAC CE, the failure detection reference signals are not reconfigured as part of the procedure and the terminal device still performs failure detection based on the BFD-RS of the failed cell. This will most likely trigger new beam failure recovery for the same SCell. Hence, the terminal device may end up sending the same SCell BFR MAC CE with information about the same cell(s) unnecessarily for multiple times.

In contrast, SpCell BFR may be triggered similarly subsequently while the other one is still ongoing. However, for SpCell BFR, this may not matter as the BFR procedure is using the random access (RA) procedure and only one RA procedure can be concurrently ongoing in the terminal device. In addition, the contention free random access (CFRA) procedure is not considered to be complete (from physical layer perspective) until the terminal device has been reconfigured with new active Transmission Configuration Indication (TCI) state for PDCCH reception (i.e., with new PDCCH beam).

Therefore, regarding BFR for a serving cell, especially for the SCells, it is desirable to have a solution to avoid unnecessary beam failure report. In particular, a solution for preventing unnecessary SCell BFR MAC CE transmission is needed. Similar issues also occur when the terminal device reports UL LBT failure on a serving cell. Hence, it is also desirable to have a solution to avoid unnecessary LBT failure report.

According to embodiments of the present disclosure, there is proposed a solution for failure recovery for a serving cell, and in particular for beam failure recovery of SCell or for reporting consistent UL LBT failure of SCell. In the present disclosure, a solution about how to prevent successive unnecessary failure reports (for example, SCell BFR MAC CE reports and UL LBT MAC CE reports) due to frequent recovery triggers is exemplified. If a failure such as a beam failure or an LBT failure is detected on a serving cell of a terminal device, the terminal device may initiate a first recovery procedure and transmit information concerning the detected failure to a network device in the first recovery procedure. The terminal device then disables further transmission of the already transmitted information.

The terminal device may disable the further transmission based on whether one or more criterion or condition has been satisfied, for example whether a corresponding timer is running, whether a response has been received or whether the information has been updated. The solution for failure recovery in accordance with embodiments of the present disclosure can be adapted to the beam failure recovery and LBT failure recovery. In this way, unnecessary failure reports can be avoided, for example, unnecessary SCell BFR MAC CE reports and unnecessary UL LBT MAC CE reports can be prevented.

Figure 2:
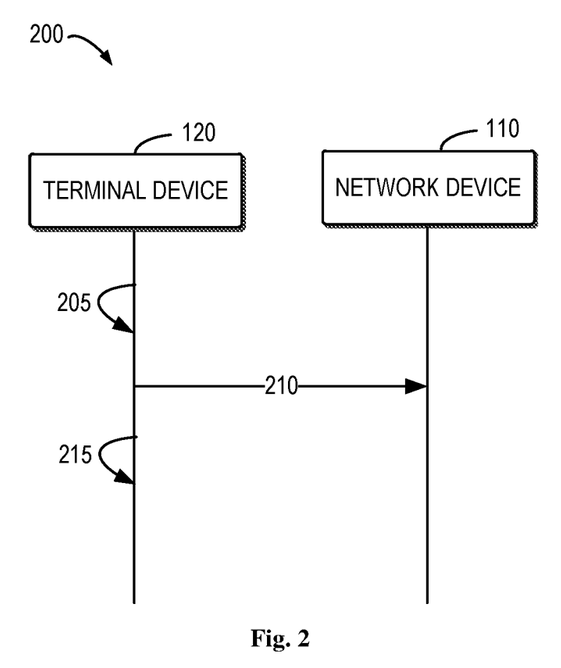
FIG. 2 illustrates a flowchart illustrating an example process for reporting beam failure according to some embodiments of the present disclosure.

Principle and implementations of the present disclosure will be described in detail below with reference to FIG. 2, which illustrates a flowchart illustrating an example process 200 for beam failure recovery according to some embodiments of the present disclosure. For the purpose of discussion, the process 200 will be described with reference to FIG. 1. The process 200 may involve the network device 110 and the terminal device 120 as illustrated in FIG. 1.

In the example process 200, the terminal device 120 detects 205 a failure on a serving cell of the terminal device 120. If the failure is detected on the serving cell, the terminal device 120 may obtain information concerning the detected failure, which may be referred to as failure information or failure recovery information herein. The detected failure may be an UL LBT failure and/or a beam failure on the serving cell. In the case of beam failure, such information may include an identification of the serving cell and identification(s) of one or more candidate beams for the serving cell and may be referred to as beam failure information herein. In the case of UL LBT failure, such information may include an identification of the serving cell.

For example, in the case of beam failure, for the SCell 102, a lower layer (e.g. the physical layer) may provide the beam failure instance indication to the MAC layer of the terminal device 120 and the MAC layer may increment the BFI_COUNTER by 1. When the value of BFI_COUNTER exceeds or equal to a threshold, the terminal device 120 may determine that a beam failure is detected on the SCell 102.

In response to the failure being detected, a recovery procedure for the serving cell is initiated and this procedure may be referred to as a first recovery procedure for purpose of discussion. For example, the MAC entity of the terminal device 120 may trigger BFR for the serving cell, such as for the SCell 102.

Then, in the first recovery procedure, the terminal device 120 transmits 210 the failure information of the service cell (e.g., the SCell 102) to the network device 110, which is associated with the serving cell or in other words provides the serving cell to the terminal device 120. For example, in the case of beam failure, the beam failure information of SCell 102 may be included in a SCell BFR MAC CE. If more than one BFR have been triggered, the SCell BFR MAC CE may include beam failure information of all the serving cells for which BFR has been triggered and/or is pending. For example, if beam failure is also detected on the SCell 103, the SCell BFR MAC CE may also include beam failure information of the SCell 103. If available UL-SCH resources can accommodate the SCell BFR MAC CE plus its subheader as a result of logical channel prioritization, the terminal device 120 may transmit the SCell BFR MAC CE by using the available UL-SCH resources. Otherwise, the terminal device 120 may trigger a scheduling request for SCell BFR to transmit the SCell BFR MAC CE after receiving an UL grant. It is to be understood that the SCell BFR MAC CE may also include beam failure information of the SpCell, for example PCell 101. In the case of consistent UL LBT failure, UL LBT MAC CE similar to the SCell BFR MAC CE is transmitted to the network device 110 to indicate the failed serving cell(s).

After transmitting the failure information, the terminal device 120 disables 215 further transmission of the same failure information to the network device 110. As an example, the terminal device 120 may disable transmission of the same failure information in another recovery procedure for the same serving cell, which may be referred to as a second recovery procedure for purpose of discussion. For example, after transmitting the SCell BFR MAC CE which includes the beam failure information of the SCell 102, the terminal device 120 may prevent another SCell BFR MAC CE including the same beam failure information from being transmitted in another BFR procedure for the SCell 102. As used herein, the act "disable" may be implemented by means of the acts "prevent", "prohibit" or the like. Disabling the further transmission of the failure information may mean directly preventing or prohibiting the failure information from being transmitted, or means preventing or prohibiting a recovery procedure in which the same failure information would otherwise be transmitted from being triggered or initiated.

In one example aspect, one or more criterions or conditions can be utilized by the terminal device 120 to determine whether to disable the further transmission of the failure information. If the one or more criterions or conditions are satisfied, the further transmission of the failure information may be disabled. Some example embodiments are described now. Only for purpose of discussion without any limitation, in the following description, the SCell 102 is taken as an example of the serving cell on which failure has been detected.

In some example embodiments, a timer with a valid period may be introduced and the terminal device 120 may disable the further transmission of the failure information based on whether the timer is running or not. For example, new recovery procedure for the SCell 102 may be prevented from being triggered if the timer is running. Such a timer may be referred to as a prohibit timer for purpose of discussion without any limitation. In the case of beam failure, the prohibit timer may be used to prevent the MAC entity of the terminal device 120 from triggering another BFR for the SCell 102 when the terminal device 120 is waiting for a response from the network device 110 to the transmitted SCell BFR MAC CE.

In one example embodiment, the terminal device 120 may start the prohibit timer associated with the SCell 102 upon the transmission of the failure information of the SCell 102 in the first recovery procedure, for example upon the transmission of the SCell BFR MAC CE which includes the beam failure information of the SCell 102 or upon instructing the multiplexing and assembly entity to generate the SCell BFR MAC CE which includes the beam failure information of the SCell 102. The terminal device 120 may disable the further transmission of the failure information in the new recovery procedure for the SCell 102 before the prohibit timer expires or when the prohibit timer is running. For example, new BFR for the SCell 102 cannot be triggered while the prohibit timer is running or the BFR for the SCell 102 can be triggered but the SCell BFR MAC CE cannot be instructed to be generated by the multiplexing and assembly entity.

In one example embodiments, if the prohibit timer expires, the terminal device 120 may enable the second recovery procedure for the SCell 102 and transmit the failure information again to the network device 110. For example, when the prohibit timer expires, the MAC entity of the terminal device 120 may trigger another BFR for the SCell 102 in case further beam failure instance indication is received from the lower layers. In other words, when further beam failure instance indication is received from the lower layer, the terminal device 120 may initiate a new beam failure recovery procedure and transmit the SCell BFR MAC CE including the beam failure information of the SCell 102 to the network device 110.

In one example embodiments, if the terminal device 120 receives from the network device 110 a response to the failure information of the SCell 102, the terminal device 120 may stop the prohibit timer. For example, the prohibit timer can be stopped when a response from the network device 110 to the transmitted MAC CE (for example, SCell BFR MAC CE or UL LBT MAC CE) is received. Such a response from the network device 110 may be e.g., HARQ ACK or an UL grant for new transmission to the HARQ process where the MAC CE was transmitted.

As such, the prohibit timer may be used as a criterion for disabling the further transmission of the failure information for SCell 102. In other words, the terminal device 120 may enable transmission of the failure information in a new recovery procedure when the prohibit timer expires and may disable transmission of the failure information in a new recovery procedure while the prohibit timer is running. For example, the terminal device 120 may trigger new BFR after the prohibit timer expires but shall not trigger new BFR while the prohibit timer is running.

The prohibit timer may be configured either per serving cell or per MAC entity. The prohibit timer may also be configured per group of SCells. The group may be a set of SCells determined by the terminal device 120 (e.g. based on configured TCI states for PDCCH or based on the failure detection reference signals used for beam failure detection) or the group may be explicitly configured by the network device 110. The group of SCells may also refer to PUCCH group (of SCells) e.g. SCells that have the same associated PUCCH configuration (e.g. one of the SCells have the PUCCH configured for uplink control transmission and the uplink control of one or more SCells are associated with the said PUCCH configuration). The terminal device 120 may be configured with one or more PUCCH groups.

In the case where the prohibit timer is configured per serving cell, the SCell 102 may have a dedicated timer. In the case where the prohibit timer is configured per MAC entity, the prohibit timer is common for all the failed cells of which the failure information has been included in the MAC CE. For example, a BFR procedure for another serving cell (e.g, the SCell 103) of which the failure information has not been included in the previously transmitted MAC CE can still be triggered even if the prohibit timer is running. In this case, the terminal device 120 may generate a new MAC CE with a multiple entries which includes the failure information of the SCell 102 and failure information of the other serving cell (e.g, the SCell 103). Alternatively, the new MAC CE may not include the failure information of SCell 102 but includes failure information of the other serving cell (e.g., the SCell 103). Upon transmission of the newly generated MAC CE which can indicate all the failed cells, the prohibit timer is restarted.

In some example embodiments, when the terminal device 120 transmits failure information of one or more failed SCells and cannot accommodate all the information (e.g. failed SCell index and potential candidate beam if exists) in the granted uplink resources, it may prioritize specific SCells which to report or it may prioritize candidate beam information on specific failed cells. In one example, the terminal device 120 may prioritize the reporting of SCell that has been configured with PUCCH i.e. a PUCCH SCell. In another example, the prioritization may be used when the terminal device 120 reports a single entry BFR MAC CE (e.g. the terminal device 120 may need to generate multiple MAC CEs to indicate information of multiple failed SCells) or when the terminal device 120 reports multi-entry BFR MAC CE where the terminal device 120 can indicate information on multiple failed SCells in a single MAC CE.

In the example embodiments where the prohibit timer is used as a criterion or condition, the network device 110 may configure the prohibit timer to the terminal device 120. For example, the length of the valid period can be configured by the network device. The network device 110 may determine the configuration information concerning the prohibit timer and transmit the configuration information to the terminal device 120, for example via RRC signaling.

In some example embodiments, whether a response to the transmitted 210 failure information has been received from the network device 110 may be used as a criterion or condition. For example, the terminal device 120 may disable the further transmission of the failure information in the second recovery procedure before the response to the transmitted failure information (for example, previously transmitted SCell BFR MAC CE) is received from the network device 110.

In some example embodiments, such a response may be at least one of a HARQ ACK to the transmitted failure information, an UL grant for transmission other than retransmission of the failure information, a command to activate or reconfigure a TCI state for the SCell 102, or an indication that the SCell 102 is de-configured, deactivated or switched into a dormant state. For example, in the case of beam failure, such a response may be a HARQ ACK or an UL grant for new transmission to the HARQ process where the SCell BFR MAC CE was transmitted; TCI state activation command or reconfiguration command for the given failed SCell 102; an indication that the SCell 102 is de-configured, deactivated or put to into dormant state; any combination thereof.

In some example embodiments, the terminal device 120 may enable the second recovery procedure for the SCell 102 if the failure information needed to report the network device 110 has been updated. If the terminal device 120 determines that the failure information for the SCell 102 has been updated, the terminal device 120 may enable the second recovery procedure, and transmit the updated failure information to the network device 110 in the second recovery procedure. For example, even if the prohibit timer is running or a response to the previously transmitted failure information has not been received from the network device 110, a MAC CE including the updated failure information can be transmitted to the network device 110.

In some example embodiments, the transmitted 210 failure information of the SCell 102 is included in a first MAC CE, and the first MAC CE may also include failure information of another serving cell, for example the SCell 103. If the failure information of the SCell 103 has been updated, then the terminal device 120 may enable a recovery procedure for the SCell 103 and generate a second MAC CE which comprises the failure information of the SCell 102 and the updated failure information of the SCell 103. Then, the terminal device 120 may transmit the second MAC CE to the network device 110 in the recovery procedure for the SCell 103. The first and second MAC CE information may be transmitted in a single MAC CE or separate MAC CEs.

In any of the example embodiments herein, the SCell BFR information may be provided in a single entry format (only information on one of the failed SCells is provided) or multi entry format (information of multiple SCells is accommodated in single MAC CE). A plurality of single entry MAC CEs may be included in a single MAC PDU and/or UL resource.

As an example, beam failure information of the SCell 102 and SCell 103 may be included a SCell BFR MAC CE which has been transmitted to the network device 110. If the terminal device 120 determines that the beam failure information of the SCell 103 has been updated, then a new BFR for the SCell 103 may be triggered and a new SCell BFR MAC CE including the beam failure information of the SCell 102 and the updated beam failure information of the SCell 103 may be generated and transmitted to the network device 110.

In some cases, the terminal device 120 may transmit single entry MAC CE to indicate failure information on failed SCell, and while the MAC CE is pending and one or more SCells are determined to be in failure condition, the terminal device 120 may generate and trigger multi-entry SCell BFR MAC CE. In some examples, the terminal device 120 may disregard the prohibit timer and transmit the MAC CE or transmit an indication (dedicated SR for BFR).

For the case of beam failure, some examples of update to the failure information are described. As an example, if the terminal device 120 has previously reported no candidate beam for the failed SCell in the previously transmitted MAC CE and a candidate beam (i.e. candidate RS that has signal quality above RSRP/RSRQ/SINR-threshold) is identified and needed to report to the network device 110, then the terminal device 120 may determine that the failure information has been be updated. In this case, the terminal device 120 may trigger dedicated SR transmission/Contention Based Random Access (CBRA) to provide a new MAC CE.

As another example, the terminal device 120 has previously reported a candidate beam above the threshold but the previously reported candidate beam is not above the threshold anymore and another candidate beam that is above the threshold can be indicated. In this case, the terminal device 120 may determine that the failure information of the failed cell has been updated.

As a further example, the terminal device 120 has previously reported a candidate beam above the threshold but the previously reported candidate beam is not above the threshold anymore and no other candidate can be indicated. In this case, the terminal device 120 may determine that the failure information of the failed cell has been updated.

In the above example aspect, the criterions or conditions for disabling the further transmission of the same failure information in the second recovery procedure are described. In another example aspect, disabling the further transmission of the same failure information in the second recovery procedure may be implemented at a variety of levels. As an example, the lower layer(s) may be prevented from detecting the failure or from providing an indication of the failure to a higher layer, for example the MAC layer. As another example, the MAC layer may prevent the second recovery procedure from being triggered or initiated even if failure detection is performed by the lower layers. As a further example, the MAC CE including the same failure information as the previously transmitted MAC CE may be prevented from being transmitted even if the second recovery procedure has been triggered. Some example embodiments in this regard are now described.

In some example embodiments, the terminal device 120 may prevent a lower layer from providing an instance indication for the failed serving cell (for example, the SCell 102) to a MAC layer of the terminal device 120. The instance indication may be used for triggering a recovery procedure for the failed serving cell. In the case of beam failure, the physical layer is prevented from providing the beam failure instance indication for the SCell 102 to the MAC layer when BFR for the SCell 102 is pending. For example, when the prohibit timer associated with the SCell 102 is running or before a response to the transmitted SCell BFR MAC CE is received from the network device 110, the physical layer is prevented or prohibited from providing the beam failure instance indication to the MAC layer.

In some example embodiments, the terminal device 120 may prevent the MAC layer of the terminal device 120 from initiating the second recovery procedure. In other words, the terminal device 120 will not trigger the second recovery procedure before the previous, first recovery procedure has been canceled. For example, if there is a pending/triggered BFR for the failed SCell 102, the MAC entity does not trigger a new BFR before the previous BFR has been cancelled, even if the beam failure instance indication(s) is received from the lower layer.

In some example embodiments, the terminal device 120 may not react on or response to the beam failure instance indication(s) from the lower layer for the failed SCell 102. In one example embodiment, the terminal device 120 may prevent a counter for instance indication from being increased, and the instance indication is used for triggering a recovery procedure for the SCell 102. For example, in the case of beam failure, the BFI_COUNTER for the SCell 102 may not be incremented even if the beam failure instance indication for the SCell 102 is received from the physical layer. In one example embodiment, the terminal device 120 may prevent a timer for failure detection of the SCell 102 from being started. In the case of beam failure, the beamFailureDetectionTimer for the SCell 102 may not be started even if the beam failure instance indication for the SCell 102 is received from the physical layer.

In some example embodiments where the failure information of the failed cell(s) is included in a MAC CE, the terminal device 120 may prevent a further MAC CE with the same information as the previously transmitted MAC CE from being transmitted. For example, in case the terminal device 120 has not received a response to a previously transmitted SCell BFR MAC CE or in case the prohibit timer is running, another SCell BFR MAC CE concerning the same serving cells triggering BFR is prohibited to be transmitted.

In some example embodiments, the terminal device 120 may determine when it would cancel pending dedicated beam failure recovery (BFR) SR/SCell BFR MAC CE transmissions. In one example, the terminal device 120 cancels the pending SR for beam failure recovery and/or the pending SCell BFR MAC CE concerning failure information of, e.g. SCell 102 only when the SCell BFR MAC CE is multiplexed into a MAC PDU that is transmitted on a non-failed SCell (e.g., SCell 103). Alternatively or additionally, the terminal device 120 performs the cancelling only if the SCell BFR MAC CE is multiplexed into a MAC PDU that is transmitted on SpCell (PCell/PSCell). In these cases, the terminal device 120 may not disable triggering beam failure recovery for SCell 102, transmission of BFR SR for beam failure recovery, or transmission of SCell BFR MAC CE including the failure information of SCell 102 unless the SCell BFR MAC CE is transmitted on a non-failed SCell (e.g., SCell 103). In other words, if SCell BFR MAC CE is transmitted in SCell 102 where beam failure is detected, the disabling is not enforced. By doing this, the network device 110 losing the failure information of SCell 102 reported by the terminal device 120 can be mitigated as well as failure reporting procedure can be faster.

In one further example embodiment, if the SR configuration for beam failure recovery is provided on PUCCH SCell and in case beam failure is detected on PUCCH SCell, the terminal device 120 triggers Random Access procedure on SpCell (PCell/PSCell). This is to ensure that UL resources are granted on SpCell which can be used to transmit the SCell BFR MAC CE when the SR for beam failure recovery is likely going to fail on PUCCH SCell (in case beam failure is detected on that PUCCH SCell).

Aspects described above are equally applicable to consistent UL LBT failure detection.

Aspects described above with respect to different example embodiments can be combined. As an example implementation, the prohibit timer may be used as the criterion for disabling the further transmission while the disable of the further transmission may be implemented by preventing the physical layer from providing the beam failure instance indication to the MAC layer.

More details of the example embodiments in accordance with the present disclosure will be described with reference to FIGS. 3-4.

Figure 3:
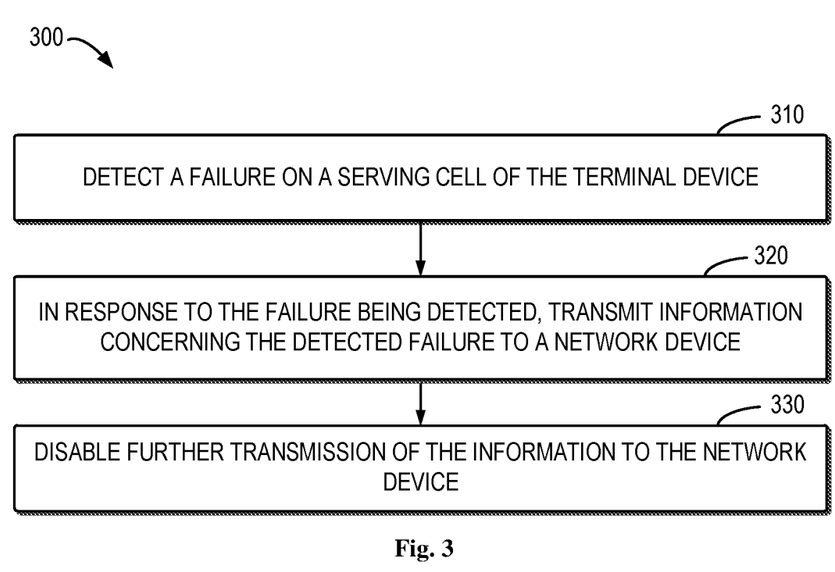
FIG. 3 illustrates a flowchart of an example method according to some embodiments of the present disclosure.

FIG. 3 shows a flowchart of an example method 300 according to some example embodiments of the present disclosure. The method 300 can be implemented at a device e.g. at the terminal device 120 as shown in FIG. 1. For the purpose of discussion, the method 300 will be described with reference to FIG. 1.

At block 310, the terminal device 120 detects detect a failure on a serving cell of the terminal device. If the beam failure is detected, at block 320 the terminal device 120 transmit information concerning the detected failure to a network device 110. The network device 110 is associated with the serving cell. At block 330, the terminal device 120 disables further transmission of the information to the network device 110.

In some example embodiments, disabling the further transmission of the information comprises: starting a first timer associated with the serving cell upon the transmission of the information, the first timer having a valid period; and disabling the further transmission of the information before the first timer expires.

In some example embodiments, the method 300 further comprises: in accordance with a determination that the first timer expires, enabling the further transmission of the information; and transmitting the information concerning the detected failure to the network device 110.

In some example embodiments, the method 300 further comprises: receiving, from the network device 110, a response to the transmitted information; and in response to receiving the response, stopping the first timer.

In some example embodiments, the method 300 further comprises: receiving configuration information concerning the first timer from the network device 110, the configuration information at least indicating the valid period.

In some example embodiments, disabling the further transmission of the information comprises: determining whether a response to the transmitted information is received from the network device 110; and in accordance with a determination that the response to the transmitted information has not been received from the network device 110, disabling the further transmission of the information.

In some example embodiments, the response comprises at least one of: a hybrid automatic repeat request, HARQ, acknowledgement to the transmitted information, an uplink grant for transmission other than retransmission of the information, a command to activate or reconfigure a transmission configuration indication, TCI, state for the serving cell, or an indication that the serving cell is de-configured, deactivated or switched into a dormant state.

In some example embodiments, disabling the further transmission of the information comprises: preventing a media access control layer of the terminal device 120 from initiating a recovery procedure for the serving cell.

In some example embodiments, disabling the further transmission of the information comprises: preventing a lower layer of the terminal device from providing an instance indication for the serving cell to a media access control layer of the terminal device 120, the instance indication used for triggering a recovery procedure for the serving cell.

In some example embodiments, disabling the further transmission of the information comprises at least one of: preventing a counter for instance indication from being increased, the instance indication used for triggering a recovery procedure for the serving cell, or preventing a second timer for failure detection of the serving cell from being started.

In some example embodiments, disabling the further transmission of the information comprises: preventing a media access control, MAC, control element, CE, comprising the information from being transmitted to the network device 110.

In some example embodiments, the method 300 further comprises: in accordance with a determination that the information concerning the detected failure has been updated, transmitting the updated information to the network device 110.

In some example embodiments, the information concerning the detected failure is transmitted in a first media access control, MAC, control element, CE, and the method 300 further comprises: in accordance with a determination that further information concerning a failure on a further serving cell of the terminal device 120 has been updated, generating a second MAC CE comprising the information and the updated further information, the further information comprised in the first MAC CE; and transmitting the second MAC CE to the network device 110.

In some example embodiments, the detected failure comprises at least one of a beam failure on the serving cell, or a listen-before-talk failure on the serving cell.

Figure 4:
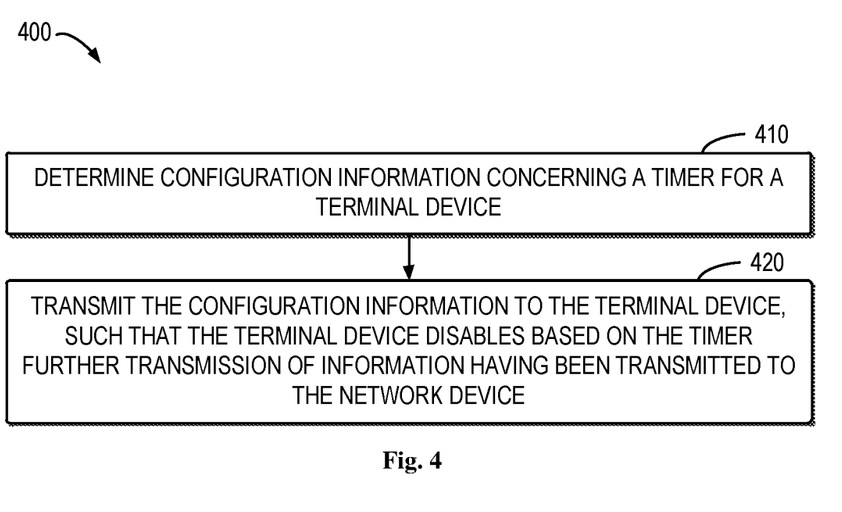
FIG. 4 illustrates a flowchart of an example method according to some embodiments of the present disclosure.

FIG. 4 shows a flowchart of an example method 400 according to some example embodiments of the present disclosure. The method 400 can be implemented at a device e.g. at the network device 110 as shown in FIG. 1. For the purpose of discussion, the method 400 will be described with reference to FIG. 1.

At block 410, the network device 110 determines configuration information concerning a timer for a terminal device 120. The configuration information at least indicates a valid period of the timer. At block 420, the network device 110 transmits the configuration information to the terminal device 120, such that the terminal device 120 disables based on the timer further transmission of information having been transmitted to the network device 110, the information concerning a failure detected on a serving cell associated with the network device 110.

In some example embodiments, an apparatus capable of performing the method 300 may comprise means for performing the respective steps of the method 300. The means may be implemented in any suitable form. For example, the means may be implemented in a circuitry or software module.

In some example embodiments, the apparatus comprises: means for detecting, at a terminal device, a failure on a serving cell of the terminal device; means for in response to the failure being detected, transmitting information concerning the detected failure to a network device, the network device associated with the serving cell; and means for disabling further transmission of the information to the network device.

In some example embodiments, the means for disabling the further transmission of the information comprises: means for starting a first timer associated with the serving cell upon the transmission of the information, the first timer having a valid period; and means for disabling the further transmission of the information before the first timer expires.

In some example embodiments, the apparatus further comprises: means for in accordance with a determination that the first timer expires, enabling the further transmission of the information; and means for transmitting the information concerning the detected failure to the network device.

In some example embodiments, the apparatus further comprises: means for receiving, from the network device, a response to the transmitted information; and means for in response to receiving the response, stopping the first timer.

In some example embodiments, the apparatus further comprises: means for receiving configuration information concerning the first timer from the network device, the configuration information at least indicating the valid period.

In some example embodiments, the means for disabling the further transmission of the information comprises: means for determining whether a response to the transmitted information is received from the network device; and means for in accordance with a determination that the response to the transmitted information has not been received from the network device, disabling the further transmission of the information.

In some example embodiments, the response comprises at least one of: a hybrid automatic repeat request, HARQ, acknowledgement to the transmitted information, an uplink grant for transmission other than retransmission of the information, a command to activate or reconfigure a transmission configuration indication, TCI, state for the serving cell, or an indication that the serving cell is de-configured, deactivated or switched into a dormant state.

In some example embodiments, the means for disabling the further transmission of the information comprises: means for preventing a media access control layer of the terminal device from initiating a recovery procedure for the serving cell.

In some example embodiments, the means for disabling the further transmission of the information comprises: means for preventing a lower layer of the terminal device from providing an instance indication for the serving cell to a media access control layer of the terminal device, the instance indication used for triggering a recovery procedure for the serving cell.

In some example embodiments, the means for disabling the further transmission of the information comprises at least one of: means for preventing a counter for instance indication from being increased, the instance indication used for triggering a recovery procedure for the serving cell, or means for preventing a second timer for failure detection of the serving cell from being started.

In some example embodiments, the means for disabling the further transmission of the information comprises: means for preventing a media access control, MAC, control element, CE, comprising the information from being transmitted to the network device.

In some example embodiments, the apparatus further comprises: means for in accordance with a determination that the information concerning the detected failure has been updated, transmitting the updated information to the network device.

In some example embodiments, the information concerning the detected failure is transmitted in a first media access control, MAC, control element, CE, and the apparatus further comprises: means for in accordance with a determination that further information concerning a failure on a further serving cell of the terminal device has been updated, generating a second MAC CE comprising the information and the updated further information, the further information comprised in the first MAC CE; and means for transmitting the second MAC CE to the network device.

In some example embodiments, the detected failure comprises at least one of a beam failure on the serving cell, or a listen-before-talk failure on the serving cell.

In some example embodiments, an apparatus capable of performing the method 400 may comprise means for performing the respective steps of the method 400. The means may be implemented in any suitable form. For example, the means may be implemented in a circuitry or software module.

In some example embodiments, the apparatus comprises: means for determining, at a network device, configuration information concerning a timer for a terminal device, the configuration information at least indicating a valid period of the timer; and means for transmitting the configuration information to the terminal device, such that the terminal device disables based on the timer further transmission of information having been transmitted to the network device, the information concerning a failure detected on a serving cell associated with the network device.

Figure 5:
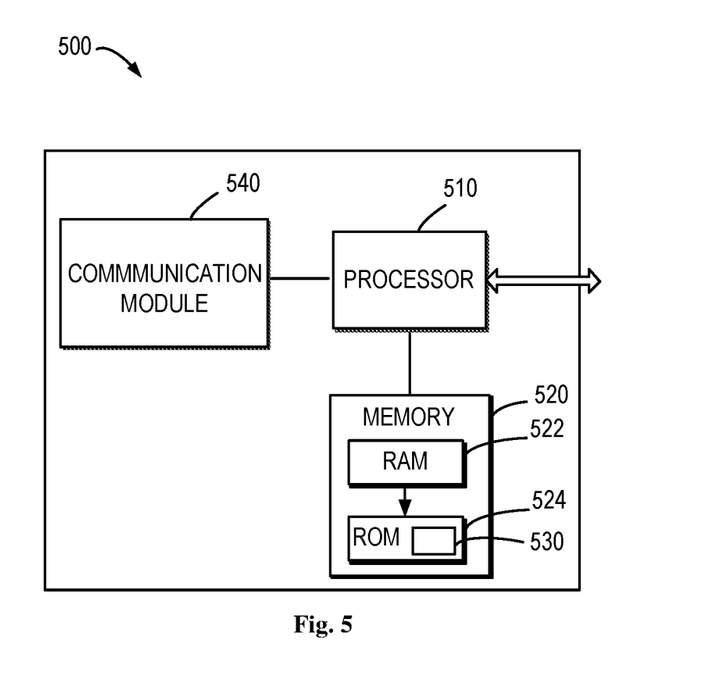
FIG. 5 illustrates a simplified block diagram of an apparatus that is suitable for implementing embodiments of the present disclosure.

FIG. 5 is a simplified block diagram of a device 500 that is suitable for implementing embodiments of the present disclosure. The device 500 may be provided to implement the communication device, for example the terminal devices 120 or the network device 110 as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 3 to 4. The embodiments of the present disclosure may also be implemented by hardware or by a combination of software and hardware.

Figure 6:
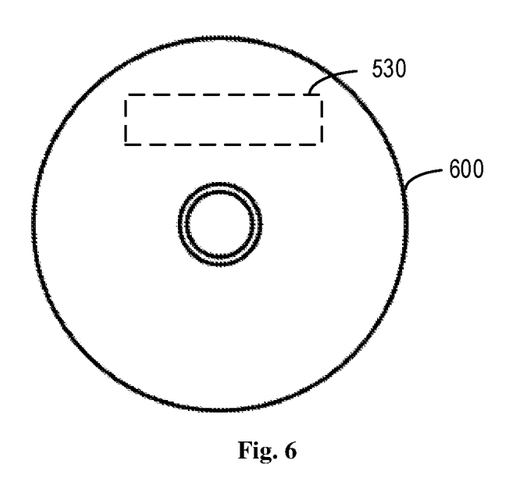
FIG. 6 illustrates a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIGS. 3-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
    at least one processor; and
    at least one memory is storing instructions, that when executed by the at least one processor, cause the terminal device at least to:
        detect a failure on a serving cell of the terminal device;
        in response to the failure being detected, transmit information concerning the detected failure to a network device, the network device associated with the serving cell; and
        prevent subsequent transmission of the information to the network device by preventing a media access control layer of the terminal device from initiating a recovery procedure for the serving cell.

2. The terminal device of claim 1, wherein the terminal device is configured to cause the prevention of the subsequent transmission of the information with:
    starting a first timer associated with the serving cell upon the transmission of the information, the first timer having a valid period; and
    preventing the subsequent transmission of the information before the first timer expires.

3. The terminal device of claim 2, wherein the at least one memory is storing instruction, that when executed by the at least one processor, cause the terminal device to:
    in accordance with a determination that the first timer expires, enable the subsequent transmission of the information; and
    transmit the information concerning the detected failure to the network device.

4. The terminal device of claim 2, wherein the at least one memory is storing instruction, that when executed by the at least one processor, cause the terminal device to at least one of:
    receive, from the network device, a response to the transmitted information; and in response to receiving the response, stop the first timer; or
    receive configuration information concerning the first timer from the network device, the configuration information at least indicating the valid period.

5. The terminal device of claim 1, wherein the terminal device is configured to cause the prevention of the subsequent transmission of the information with:
 determining whether a response to the transmitted information is received from the network device; and
 in accordance with a determination that the response to the transmitted information has not been received from the network device, preventing the subsequent transmission of the information.

6. The terminal device of claim 5, wherein the response comprises at least one of:
 a hybrid automatic repeat request acknowledgement to the transmitted information,
 an uplink grant for transmission other than retransmission of the information,
 a command to activate or reconfigure a transmission configuration indication state for the serving cell, or
 an indication that the serving cell is de-configured, deactivated or switched into a dormant state.

7. The terminal device of claim 1, wherein the at least one memory is storing instruction, that when executed by the at least one processor, cause the terminal device to:
 in accordance with a determination that the information concerning the detected failure has been updated, transmit the updated information to the network device.

8. The terminal device of claim 1, wherein the information concerning the detected failure is transmitted in a first media access control (MAC) control element (CE), and the terminal device is further caused to:
 in accordance with a determination that second information concerning a failure on a second serving cell of the terminal device has been updated, generate a second media access control (MAC) control element (CE) comprising the information and the updated second information, the second information comprised in the first media access control (MAC) control element (CE); and
 transmit the second media access control (MAC) control element (CE) to the network device.

9. The terminal device of claim 1, wherein the detected failure comprises at least one of a beam failure on the serving cell, or a listen-before-talk failure on the serving cell.

10. A method comprising:
 detecting, at a terminal device, a failure on a serving cell of the terminal device;
 in response to the failure being detected, transmitting information concerning the detected failure to a network device, the network device associated with the serving cell; and
 preventing subsequent transmission of the information to the network device by preventing a media access control layer of the terminal device from initiating a recovery procedure for the serving cell.

11. The method of claim 10, wherein preventing subsequent transmission of the information comprises:
 starting a first timer associated with the serving cell upon the transmission of the information, the first timer having a valid period; and
 preventing the subsequent transmission of the information before the first timer expires.

12. The method of claim 11, further comprising:
 in accordance with a determination that the first timer expires, permitting the subsequent transmission of the information; and
 transmitting the information concerning the detected failure to the network device.

13. The method of claim 11, further comprising at least one of:
 receiving, from the network device, a response to the transmitted information; and in response to receiving the response, stopping the first timer, or
 receiving configuration information concerning the first timer from the network device, the configuration information at least indicating the valid period.

14. The method of claim 10, wherein preventing the subsequent transmission of the information comprises:
 determining whether a response to the transmitted information is received from the network device; and
 in accordance with a determination that the response to the transmitted information has not been received from the network device, preventing the subsequent transmission of the information.

15. The method of claim 10, further comprising:
 in accordance with a determination that the information concerning the detected failure has been updated, transmitting the updated information to the network device.

16. The method of claim 10, wherein the information concerning the detected failure is transmitted in a first media access control (MAC) control element (CE), and the method further comprises:
 in accordance with a determination that second information concerning a failure on a second serving cell of the terminal device has been updated, generating a second media access control (MAC) control element (CE) comprising the information and the updated second information, the second information comprised in the first media access control (MAC) control element (CE); and
 transmitting the second media access control (MAC) control element (CE) to the network device.

17. A non-transitory computer readable medium comprising program instructions for causing an apparatus to perform at least the method of claim 10.

* * * * *